US006307343B1

(12) United States Patent
Lee et al.

(10) Patent No.: US 6,307,343 B1
(45) Date of Patent: Oct. 23, 2001

(54) DRIVING CONTROLLING APPARATUS OF A HOOD MOTOR

(75) Inventors: Sung-ho Lee; Young-won Cho, both of Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/501,628

(22) Filed: Feb. 10, 2000

(30) Foreign Application Priority Data

Aug. 20, 1999 (KR) .................................... 99-34659

(51) Int. Cl.[7] .............................. H02P 1/04; H05B 6/08

(52) U.S. Cl. ........................ 318/472; 318/471; 219/702; 62/89

(58) Field of Search .............................. 318/472, 473, 318/476; 126/299 R, 299 D; 219/702, 716, 757, 710, 718; 388/831, 827; 62/89, 186, 408, 209; 454/62, 61

(56) References Cited

U.S. PATENT DOCUMENTS

| | | | |
|---|---|---|---|
| 3,625,135 | * | 12/1971 | Carlson . |
| 4,078,393 | * | 3/1978 | Wills . |
| 4,358,730 | * | 11/1982 | Beifus . |
| 4,528,898 | * | 7/1985 | Sharp et al. . |
| 4,773,311 | * | 9/1988 | Sharp . |
| 4,954,693 | * | 9/1990 | Mitsuhashi et al. . |
| 5,039,006 | * | 8/1991 | Habegger . |
| 5,333,783 | * | 8/1994 | Catan . |
| 5,697,838 | * | 12/1997 | Morris . |
| 5,713,346 | * | 2/1998 | Kuecher . |
| 5,907,953 | * | 6/1999 | Kang et al. . |
| 6,021,252 | * | 2/2000 | Faris et al. . |
| 6,072,169 | * | 6/2000 | Kang et al. . |
| 6,093,922 | * | 7/2000 | Kim . |
| 6,104,016 | * | 8/2000 | Lee . |
| 6,170,480 | * | 1/2001 | Melink et al. . |

* cited by examiner

*Primary Examiner*—Paul Ip
(74) *Attorney, Agent, or Firm*—Robert E. Bushnell, Esq.

(57) ABSTRACT

A driving controlling apparatus of a hood motor, including: hood motor means rotatably driven for ventilating the inner portion of a system; main controlling means for generating control signals for controlling the operation of the hood motor; sub-controlling means for controlling the driving of the hood motor by sensing temperature changes in the system; and driving circuit means for controlling the driving of the hood motor in accordance with the control signal of the main controlling means and the driving controlling of the sub-controlling means.

17 Claims, 3 Drawing Sheets

DRIVING CONTROLLING APPARATUS OF A HOOD MOTOR

CLAIM OF PRIORITY

This application makes reference to, incorporates the same herein, and claims all benefits accruing under 35 U.S.C. §119 from an application for SAFETY CONTROL APPARATUS FOR A HOOD MOTOR earlier filed in the Korean Industrial Property Office on Aug. 20, 1999 and there duly assigned Ser. No. 34659/1999.

BACKGROUND OF THE INVENTION

1. Field of the Invention

The present invention relates to a hood motor of a gas range, and more particulary to a driving controlling apparatus of a hood motor for switching on/off the driving of the hood motor and for controlling the rotational speed of a hood motor.

2. Description of the Related Art

Generally, a hood motor ventilates hot-air generated from the lower side of a gas range, and the odor of foods being cooked. Such a hood motor includes a driving controlling apparatus for starting/stopping the driving of the motor, and for controlling the rotational speed of the motor by using a temperature sensor installed therein for sensing the temperature rise.

FIG. 1 is a circuit diagram for showing a conventional driving controlling apparatus of a hood motor.

As shown in FIG. 1, the conventional driving controlling apparatus of the hood motor includes a hood motor 1, a thermal cut out (hereinafter called TCO), a motor driving relay 2, and a motor rotational speed switching relay 3.

The hood motor 1 includes a temperature protector (hereinafter called T/P), inductors L1, L2, and L3, and a capacitor C. Between the inductors L2 and L3 of the hood motor 1, a low-velocity transfer contact L of the motor rotational speed switching relay 3 is connected, while a high-speed transfer contact H is connected between the inductors L1 and L3 of the motor rotational speed switching relay 3.

Further, the motor driving relay 2 includes an exciting coil which is connected with a motor driving button, while both ends of the TCO are connected with a switching terminal T1 and a switching-on contact, respectively.

The exciting coil of the motor rotational speed switching relay 3 is connected with a speed switching button which is manipulated by a user, while another switching terminal T2 is connected with the switching-on contact of the motor driving relay 2.

In the driving controlling apparatus of the hood motor constructed as above, when the user wants to ventilate the gas range, the user manipulates the motor driving button to connect the switching terminal T1 of the motor driving relay 2 to the switching-on contact. Accordingly, commonly used alternating current (hereinafter called AC power) is applied to the hood motor 1, so that the hood motor 1 is rotatably driven.

In such a situation, when the user manipulates the speed switching button, the motor rotational speed switching relay 3 varies the rotational speed of the hood motor 1, in accordance with the contact of the switching terminal T2 with the low-velocity transfer contact L or with the highvelocity transfer contact H, by the selective manipulation of the user through the speed switching button.

Meanwhile, when the temperature in the gas range rises over a certain temperature, the TCO which senses such a temperature rise is switched on. Accordingly, the hood motor 1 is rotatably driven by AC power due to a closed circuit formed by the TCO, even when the switching terminal T1 of the motor driving relay 2 is not switched on to the switching-on contact.

In such a situation, also, the rotational speed of the hood motor 1 is adjusted by the user who manipulates the speed switching button by selectively switching the motor rotational speed switching relay 3.

In the conventional driving controlling apparatus of the hood motor, however, since expensive relays have to be employed to switch on/off the hood motor and to control the rotational speed of the hood motor, the manufacturing cost is considerably higher. Further, as the relays are frequently used, there occurs poor contact of the relays, so that the driving reliability of the circuit is deteriorated.

Accordingly, there is a growing demand for a driving controlling apparatus that can substitute the conventional hood motor driving method employing expensive relays, which is inexpensive, and has higher reliability.

SUMMARY OF THE INVENTION

The present invention has been developed to overcome the above-mentioned problems of the related art, and accordingly, it is an object of the present invention to provide a driving controlling apparatus of a hood motor capable of on/off driving the hood motor and controlling the rotational speed of the hood motor without employing expensive relays, by the pulse width modulation controlling of a microcomputer.

Another object of the present invention is to provide a driving controlling apparatus of a hood motor capable of on/off driving the hood motor by sensing a temperature rise in a gas range even without a pulse width modulation controlling of a microcomputer.

The above objects are accomplished by a driving controlling apparatus of a hood motor according to the present invention, including: hood motor means rotatably driven for ventilating the inner portion of a system; main controlling means for generating control signals for controlling the operation of the hood motor, sub-controlling means for controlling the driving of the hood motor by sensing temperature change in the system; and driving circuit means for controlling the driving of the hood motor in accordance with the control signal of the main controlling means and the driving controlling of the sub-controlling means.

Preferably, the main controlling means generates control signals for on/off driving the hood motor, and for controlling the switching of the rotational speed of the hood motor.

More preferably, the main controlling means includes: a microcomputer for outputting pulse width modulation control signals of varied duty cycle in accordance with a low-speed mode and a high-speed mode; and a transistor on/off driven by the pulse width modulation control signals from the microcomputer, for generating pulse signals.

Further, the sub-controlling means includes: a printed circuit board power circuit for generating a certain driving voltage; a voltage dividing circuit for dividing a certain driving voltage from the printed circuit board power circuit; and a temperature switch for sensing a temperature rise of the inner portion of the system to a certain degree, the temperature switch being switched on/off for applying the partial voltage divided by the voltage dividing circuit into the driving circuit means.

Further, the driving circuit means includes: a switching regulator for outputting driving pulse signals of a certain frequency by pulse signals applied from a transistor of the controlling means; and a transistor driven by the driving pulse signals from the switching regulator for controlling the applying of direct current power to the hood motor from the rectifier circuit means.

In a driving controlling apparatus of a hood motor constructed as above according to the present invention, since inexpensive transistors are employed to on/off drive the hood motor and to control the rotational speed of the hood motor, instead of the conventionally-used expensive relays, the manufacturing cost is significantly reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
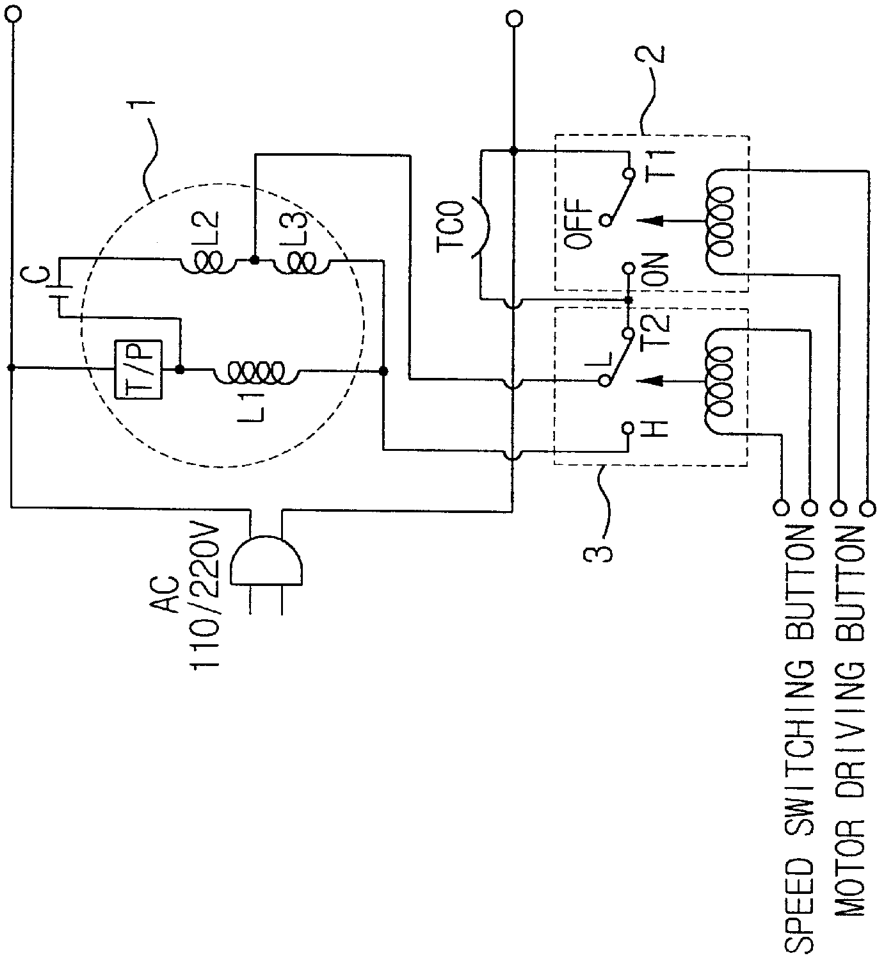
Fig. 1 (Prior Art)
FIG. 1 is a circuit diagram for showing a conventional driving controlling apparatus of a hood motor.

Hereinafter, the preferred embodiment of the present invention will be described in greater detail with reference to the accompanied drawings, while the like elements are referred to by the same reference numerals throughout.

The main feature of the first preferred embodiment of the present invention is that the rotational speed of a hood motor is controlled by controlling a switching time of a transistor, which is performed by varying a duty cycle of a pulse width modulation (hereinafter called PWM) generated from a microcomputer. Further, according to the first preferred embodiment of the present invention, when there is temperature rise in the gas range, a temperature sensor which senses such a temperature rise is switched on, to thereby drive the hood motor by direct current (hereinafter called DC power) from a power circuit of a printed circuit board (hereinafter called PCB).

Figure 2:
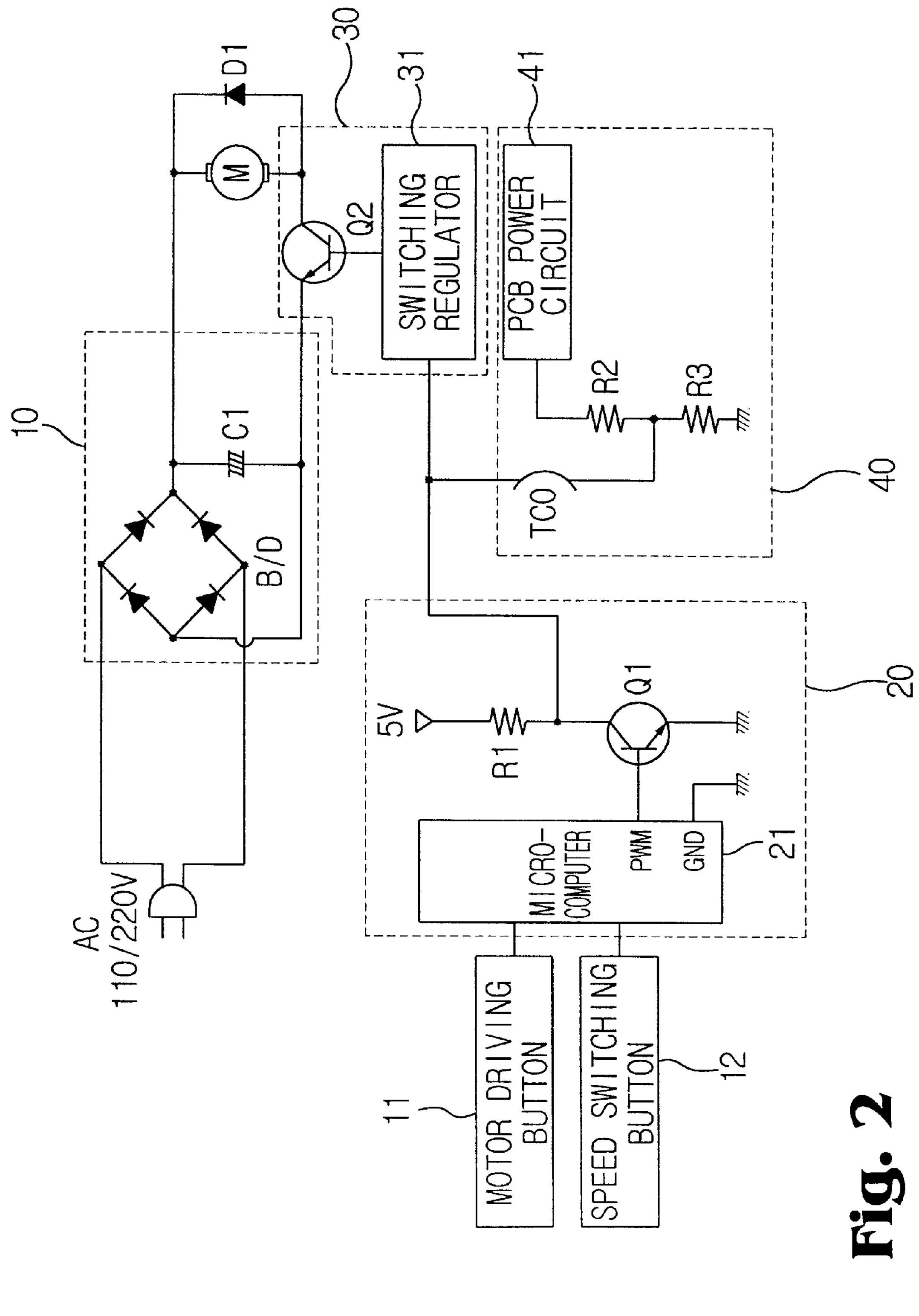
FIG. 2 is a circuit diagram for showing a driving controlling apparatus of a hood motor according to a first preferred embodiment of the present invention.

FIG. 2 shows the driving controlling apparatus of the hood motor according to the first preferred embodiment of the present invention.

As shown in FIG. 2, the driving controlling apparatus of the hood motor according to the first preferred embodiment of the present invention includes a rectifier circuit section 10, a motor driving button 11, a speed switching button 12, a first driving controlling section 20, a driving circuit section 30, a second driving controlling section 40, and a hood motor M.

The rectifier circuit section 10 includes a bridge diode B/D for full-wave rectifying the AC power, and a smoothing capacitor C1 for smoothing the voltage which is full-wave rectified.

The first driving controlling section 20 includes a microcomputer 21 connected with the motor driving button 11 and the speed switching button 12, and having a PWM port, and a ground terminal GND, and a first transistor Q1 having abase electrode connected with the PWM port of the microcomputer 21, and a collector electrode connected with the driving circuit section 30.

The microcomputer 21 outputs PWM control signals for on/off driving the hood motor M and for controlling the rotational speed of the hood motor M by the manipulation of the motor driving button 11 and the speed switching button 12. The first transistor Q1 outputs the pulse signals which are phase-inverted through the collector electrode thereof by being driven by the PWM control signals applied from the microcomputer 21.

Here, the microcomputer 21 outputs the PWM control signal having a duty cycle corresponding to a predetermined rotational speed when there is a button manipulation of the motor driving button 11.

Further, when the low-velocity mode is selected by the button manipulation of the speed switching button 12, the microcomputer 21 outputs the PWM control signal of a certain frequency such as the frequency of 4KHz having a small duty cycle. Then when the high-speed mode is selected by the button manipulation through the speed switching button 12, the microcomputer 21 outputs the PWM control signal having the same frequency with the low-speed mode such as the frequency of 4KHz, but with a larger duty cycle.

Meanwhile, the microcomputer used for controlling the general functions of the gas range may be used as the microcomputer 21, or there may be an additional microcomputer for specifically controlling the driving of the hood motor M in addition to the microcomputer of the gas range.

Further, the driving circuit section 30 includes a switching regulator 31, and a second transistor Q2. A signal input port of the switching regulator 31 is connected with a collector electrode of the first transistor Q1 and the second driving controlling section 40. A collector electrode of the second transistor Q2 is connected with one end of the hood motor M, while an emitter electrode is connected with the smoothing capacitor C1 and the bridge diode B/D.

The switching regulator 31 generates a driving pulse signal having the same duty cycle with the PWM control signal, but with a higher frequency such as 20 KHz, with the pulse signals applied from the collector electrode of the first transistor Q1.

The second transistor Q2 on/off controls the hood motor M, and also controls the rotational speed of the hood motor M, by being driven by the driving pulse signal applied to the base electrode thereof from the switching regulator 31.

Further, the power circuit, i.e., the second driving section 40 includes a PCB power circuit 41 having a plurality of circuit elements mounted on the PCB of the gas range, for supplying the DC power of a certain voltage such as the voltage of 5V, a plurality of voltage dividing resistors R2 and R3 connected in series between the power output port and the ground end of the PCT power circuit 41, and a TCO connected with the signal input port of the switching regulator 31.

A plurality of voltage dividing resistors R2 and R3 divide a certain DC voltage such as 5V from the PCB power circuit 41, for applying the voltage that falls into a certain voltage range such as the voltage range of 0.7V–3V for driving the driving circuit section 30.

The TCO is disposed at the lower side of the gas range, and is switched on upon sensing a temperature rise to a certain degree in the gas range.

Here, the undesignated reference symbol D1 refers to a diode for protecting the hood motor M by bypassing over-current flowing to the hood motor M, in a manner that the diode D1 is turned on when the voltage applied to the hood motor M rises to a certain voltage.

Hereinafter, the operation of the driving controlling apparatus of the hood motor constructed as above according to the first preferred embodiment of the present invention will be described with reference to FIG. 2.

First, the commonly used AC power supplied from the outside is full-wave rectified by the bridge diode B/D of the rectifier circuit section 10, and is smoothed by the smoothing capacitor C1 to be supplied to the hood motor M in the form of DC power.

In such a situation, when the motor driving button 11 is manipulated for driving the hood motor M, the microcomputer 21 generates the PWM control signal having a certain duty cycle through the PWM output port in accordance with the button manipulation of the motor driving button 11.

The first transistor Q1 generates the pulse signal which is phase-inverted through the collector electrode thereof, while being on/off driven in accordance with the duty cycle of the PWM control signal which is applied to the base electrode thereof.

While the first transistor Q1 is driven, a certain DC power such as the DC voltage of 5V is dropped by the resistor R1 into a lower DC power such as the voltage of 3V, and is generated in the form of a pulse signal through the collector electrode thereof.

Accordingly, the switching regulator 31 of the driving circuit section 30 receives the pulse signal from the collector electrode of the first transistor Q1, and outputs the driving pulse signal having a higher frequency than the PWM control signal such as the frequency of 20 KHz.

Accordingly, the second transistor T2 of the driving circuit section 30 is on/off driven in accordance with the duty cycle of the driving pulse signal which is applied to the base electrode thereof from the switching regulator 31. The hood motor M is rotated at a certain speed by the DC power applied from the rectifier circuit section 10 in accordance with the on/off driving of the second transistor Q2.

Meanwhile, when the high-speed mode is selected by the button manipulation of the speed switching button 12, the microcomputer 21 outputs the PWM control signal having a larger duty cycle through the PWM signal output port in accordance with the button manipulation of the speed switching button 12.

Accordingly, as the duty cycle of the PWM control signal generated from the microcomputer 21 becomes larger, the pulse width of the PWM signal from the collector electrode of the first transistor Q1 is increased.

Accordingly, the pulse width of the driving pulse signal generated from the switching regulator 31 is increased to correspond to the pulse signal generated from the collector electrode of the first transistor Q1. The driving time of the second transistor Q2 is also increased as much as the pulse width increase of the driving pulse signal of the switching regulator 31.

As a result, the hood motor M is rotated at a higher speed by the electric current applied from the rectifier circuit section 10.

Meanwhile, when the low-speed mode is selected by the button manipulation of the speed switching button 12, the microcomputer 21 outputs the PWM control signal having a smaller duty cycle to correspond to the low-speed mode. The first transistor Q1 generates the pulse signal having a reduced pulse width to correspond to the smaller duty cycle of the PWM control signal.

Accordingly, the switching regulator 31 generates the driving pulse signal having the reduced pulse width to correspond to the pulse signal of reduced pulse width from the first transistor Q1. Also, the driving time of the second transistor Q2 is reduced as much as the pulse width reduction of the driving pulse signal.

As the driving time of the second transistor Q2 is reduced, the electric current applied from the rectifier circuit section 10 is reduced, so that the hood motor M is rotated at a lower speed.

Meanwhile, there may be a case when the motor driving button 11 and the speed switching button 12 are not manipulated, so that the microcomputer 21 is not operated while the temperature in the gas range is increased. Also, even though the motor driving button 11 and the speed switching button 12 are correctly manipulated, there may be a case when the PWM control signal is not generated due to the malfunction of the microcomputer 21, and the temperature in the gas range is increased. In such cases, the TCO of the second driving controlling section 40 senses the temperature rise to a certain degree and is accordingly switched on.

As the TCO is switched on, the voltage signal of the partial voltage of a certain degree such as 3V, which is the divided voltage from the certain voltage generated from the PCB power circuit 41 such as the voltage of 5V by the voltage dividing resistors R2 and R3, is inputted to the switching regulator 31 through the TCO.

The switching regulator 31 generates the driving pulse signal having the same pulse width as the low-speed mode, with a certain frequency such as the frequency of 20 KHz with the voltage signal applied from the second driving controlling section 40.

The second transistor Q2 rotates the hood motor M by being on/off driven by the driving pulse signal applied from the switching regulator 31.

Next, the driving controlling apparatus of the hood motor according to the second preferred embodiment will be described below with the accompanying drawings.

Figure 3:
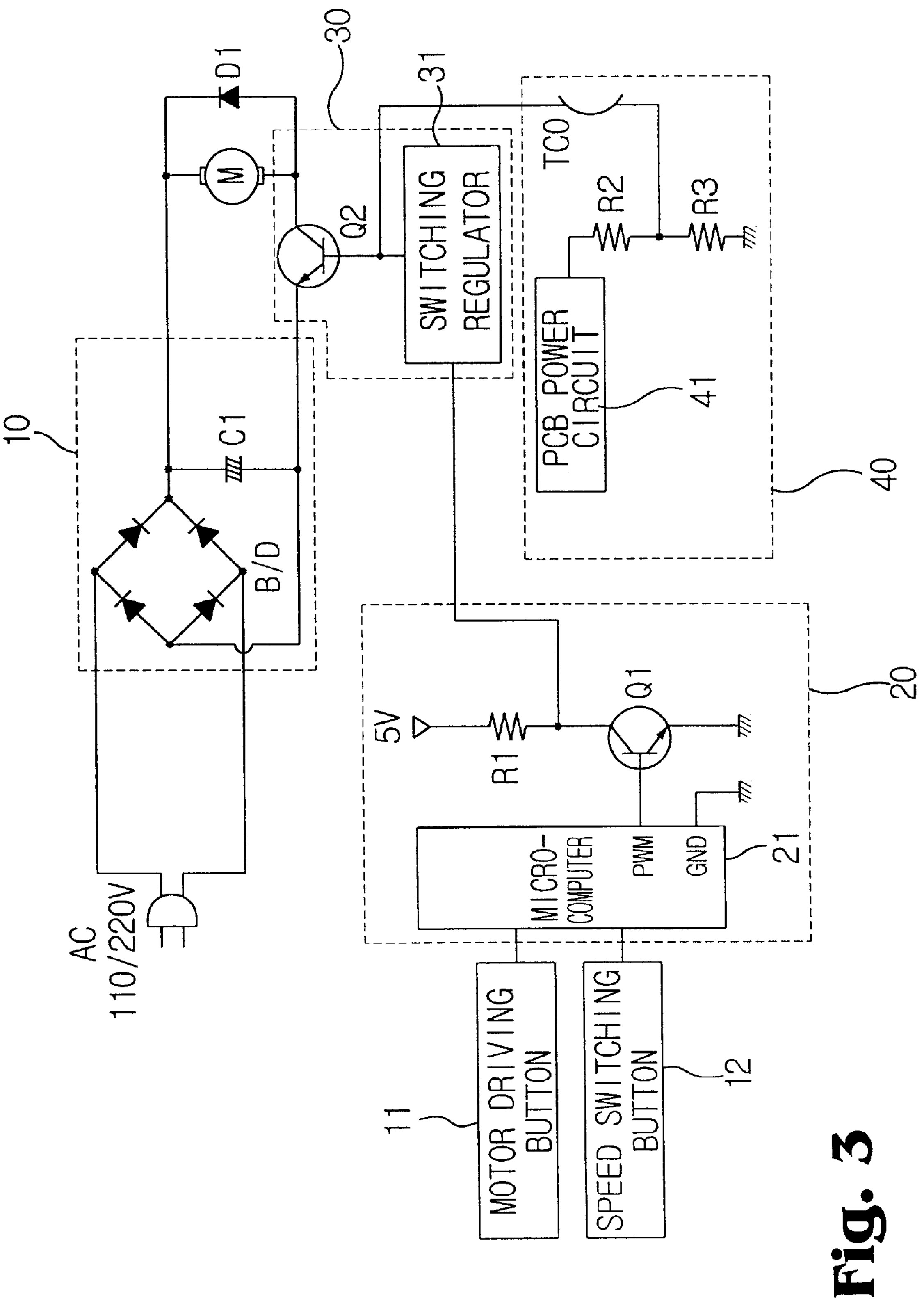
FIG. 3 is a circuit diagram for showing a driving controlling apparatus of a hood motor according to a second preferred embodiment of the present invention.

FIG. 3 is a circuit diagram for showing the driving controlling apparatus of the hood motor according to the second preferred embodiment of the present invention.

As shown in FIG. 3, in the description of the second preferred embodiment, the description of the rectifier circuit section 10, the first driving controlling section 20, and the driving circuit section 30 will be omitted since they have the same construction as described above in the first preferred embodiment.

The unique feature of the second preferred embodiment of the present invention lies in the point where the output voltage from the second driving controlling section 40 is applied to the driving circuit section 30.

That is, according to the first preferred embodiment of the present invention, the partial voltage from the PCB power circuit 41 through the TCO, is applied to the signal input port of the switching regulator 31.

Meanwhile, according to the second preferred embodiment of the present invention, the partial voltage from the PCB power circuit 41 through the TCO is directly applied to the second transistor Q2 of the driving circuit section 30.

With the partial voltage applied from the second driving controlling section 40 to the base electrode thereof, the second transistor Q2 keeps being driven.

Accordingly, the hood motor M is rotated at a high speed by the electric current constantly applied from the rectifier circuit section 10 in accordance with the constant driving of the second transistor Q2.

As described above, according to the present invention, the driving controlling apparatus of the hood motor according to the present invention employs inexpensive transistors instead of the expensive relays to on/off drive the hood motor, and to control the rotational speed of the hood motor by controlling the PWM with the microcomputer. Accordingly, the manufacturing cost is reduced, while the reliability of the circuit is improved.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A driving controlling apparatus of a hood motor comprising:

hood motor means rotatably driven for ventilating an inner portion of a system;

main controlling means for generating control signals for controlling the operation of said hood motor;

sub-controlling means for controlling the driving of said hood motor by sensing temperature changes in said system, said sub-controlling means comprising:

a printed circuit board power circuit for generating a certain driving voltage;

a voltage dividing circuit for dividing said certain driving voltage from said printed circuit board power circuit into a voltage; and a temperature switch for sensing a temperature rise of said inner portion of said system to a certain degree, said temperature switch being switched on/off for applying said voltage signal divided by said voltage dividing circuit into said driving circuit means driving circuit means for controlling the driving of said hood motor in accordance with said control signals of said main controlling means and said driving controlling of said sub-controlling means, said driving circuit means comprising:

a switching regulator for outputting driving pulse signals of a certain frequency by receiving pulse signals from a first transistor of said controlling means; and a second transistor driven by said driving pulse signals generated from said switching regulator for controlling the application of direct current power to said hood motor from a direct current power source, wherein said voltage signal which is divided by said voltage dividing circuit through said temperature switch is applied to said switching regulator.

2. The driving controlling apparatus as claimed in claim 1, wherein said main controlling means generates first and second signals for on/off driving said hood motor and for controlling a rotational speed of said hood motor.

3. The driving controlling apparatus as claimed in claim 2, with said main controller comprising:

a microcomputer for outputting pulse width modulation control signals having a varied duty cycle in accordance with a low-speed mode and a high-speed mode; and said first transistor on/off driven by one of said pulse width modulation control signals generated from said microcomputer, generating one of said first and second signals.

4. The apparatus of claim 2, wherein said first and second signals are first and second pulse width modulation control signals each having a varied duty cycle, respectively.

5. The apparatus of claim 2, wherein said first and second signals are different from each other while said divided signal is different from both said first and second signals.

6. The apparatus of claim 2, wherein said motor driving circuit means turns on and off said hood motor means in accordance with said voltage signal regardless of said first and second signals.

7. The apparatus of claim 2, wherein said driving circuit means turns on and off said motor in accordance with said voltage signal when said voltage signal exists regardless of said first and second signals.

8. The apparatus of claim 2, wherein a first on and off driving cycle generated from said driving circuit means in accordance with said one of said first and second signals is same as a second on and off driving cycle generated from said motor driving circuit in accordance with said voltage signal.

9. The apparatus of claim 2, with said driving circuit means generating a first on and off driving cycle when one of said first and third signals is transmitted to said motor driving circuit while generating a second on and off driving cycle when said second signal is transmitted to said motor driving circuit, said first on and off cycle being different from said second on and off cycle.

10. The apparatus of claim 1, wherein said temperature switch is turned on when said temperature rise sensed by a temperature sensor is a reference value.

11. The apparatus of claim 1, further comprising:

two conductors coupled between said hood motor and said direct current power source for supplying said direct current power from said direct current power source to said hood motor; and said driving circuit means disposed on one of said conductors to close and open said one of said conductors.

12. The apparatus of claim 11, wherein said driving circuit means turns on and off said hood motor with a predetermined frequency by closing and opening said one of said conductors.

13. The apparatus of claim 1, further comprising:

two conductors coupled between said hood motor and said direct current power source for supplying direct current power from said direct current power source to said hood motor; and said driving circuit means having said second transistor disposed on said one of said conductors and having said switching regulator coupled to said second transistor, said switching regulator generating said pulse signals having a predetermined frequency for turning on and off said second transistor in accordance with said pulse signals.

14. The apparatus of claim 13, with said temperature switch coupled to said second transistor of said driving circuit means, said transistor turned on and off in accordance with said voltage signal.

15. The apparatus of claim 14, wherein said voltage signal transmitted to said second transistor from said temperature switch is a direct current voltage while said pulse signals transmitted from said switch regulator to said transistor is a pulse width modulation signal having a varied duty cycle.

16. The apparatus of claim 1, with said driving circuit means controlling said hood motor in response to said voltage signal when said hood motor is not manipulated by a user.

17. A driving controlling apparatus of a head motor, comprising:

hood motor means rotatably driven for ventilating an inner portion of a system;

main controlling means for generating control signals for controlling the operation of said hood motor;

sub-controlling means for controlling the driving of said hood motor by sensing temperature changes in said system;

said sub-controlling means comprising:

a printed circuit board power circuit for generating a certain driving voltage;

a voltage dividing circuit for dividing said certain driving voltage from said printed circuit board power circuit; and a temperature switch for sensing a temperature rise of said inner portion of said system to a certain degree, said temperature switch being switched on/off for applying the partial voltage divided by said voltage dividing circuit into said driving circuit means; and driving circuit means for controlling the driving of said hood motor in accordance with said control signal of said main controlling means and the driving controlling of said sub-controlling means, said driving circuit means, comprising:

a switching regulator for outputting driving pulse signals of a certain frequency by receiving pulse signals from a transistor of the controlling means; and a second transistor driven by said driving pulse signals from said switching regulator for controlling the application of direct current power to said hood motor from rectifier circuit means, wherein the voltage which is divided by said voltage dividing circuit through said temperature switch is applied to said second transistor.

* * * * *